(12) United States Patent
Torigoshi et al.

(10) Patent No.: US 9,620,289 B2
(45) Date of Patent: Apr. 11, 2017

(54) CERAMIC CAPACITOR FOR SUPPRESSING HIGH-FREQUENCY NOISE

(71) Applicant: Kabushiki Kaisha Toshiba, Tokyo (JP)

(72) Inventors: Yasuki Torigoshi, Tachikawa (JP); Nobuyuki Kasai, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 255 days.

(21) Appl. No.: 14/475,088

(22) Filed: Sep. 2, 2014

(65) Prior Publication Data
US 2015/0146344 A1     May 28, 2015

Related U.S. Application Data

(60) Provisional application No. 61/909,802, filed on Nov. 27, 2013.

(51) Int. Cl.
| H01G 4/30 | (2006.01) |
| H01G 4/232 | (2006.01) |
| H01G 4/012 | (2006.01) |
| H01G 4/005 | (2006.01) |
| H01G 4/228 | (2006.01) |
| H01G 4/35 | (2006.01) |
| H01G 4/12 | (2006.01) |

(52) U.S. Cl.
CPC ............... *H01G 4/30* (2013.01); *H01G 4/012* (2013.01); *H01G 4/232* (2013.01); *H01G 4/35* (2013.01); *H01G 4/12* (2013.01)

(58) Field of Classification Search
CPC ........... H01G 4/30; H01G 4/232; H01G 4/012
USPC ............. 361/303, 306.1, 301.4, 306.3, 321.1
See application file for complete search history.

(56) References Cited

U.S. PATENT DOCUMENTS

| 2004/0179325 A1* | 9/2004 | Togashi ................. H01G 4/012 361/306.3 |
| 2004/0184202 A1* | 9/2004 | Togashi ................... H01G 4/30 361/15 |

FOREIGN PATENT DOCUMENTS

| JP | 2001-015384 | 1/2001 |
| JP | 2004-172466 | 6/2004 |
| JP | 2006-190774 | 7/2006 |
| JP | 2012-138391 | 7/2012 |

* cited by examiner

*Primary Examiner* — Eric Thomas
*Assistant Examiner* — Arun Ramaswamy
(74) *Attorney, Agent, or Firm* — Rutan & Tucker, LLP

(57) ABSTRACT

According to an embodiment, first and second internal electrode layers are alternatively interposed between dielectric layers to form a laminated capacitor. The first internal electrode layer have a first base portion connected to a first external electrode, and is extended from the first base portion toward a second external electrode. The second internal electrode layer have a base portion connected to the second external electrode, and is extended from the second external electrode toward the first external electrode. The second internal electrode layer is formed in a deformation pattern which allows a path length greater than a length between the first and the second external electrode so that an open stub producing an open stub resonance is formed.

7 Claims, 12 Drawing Sheets

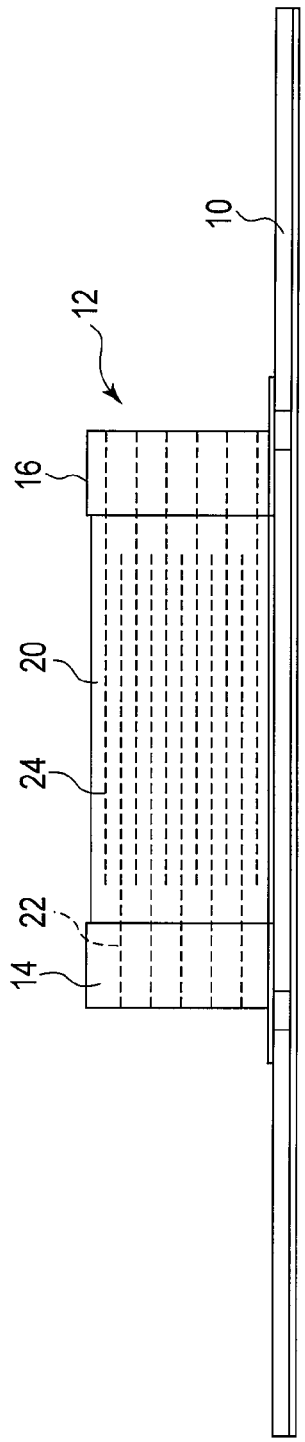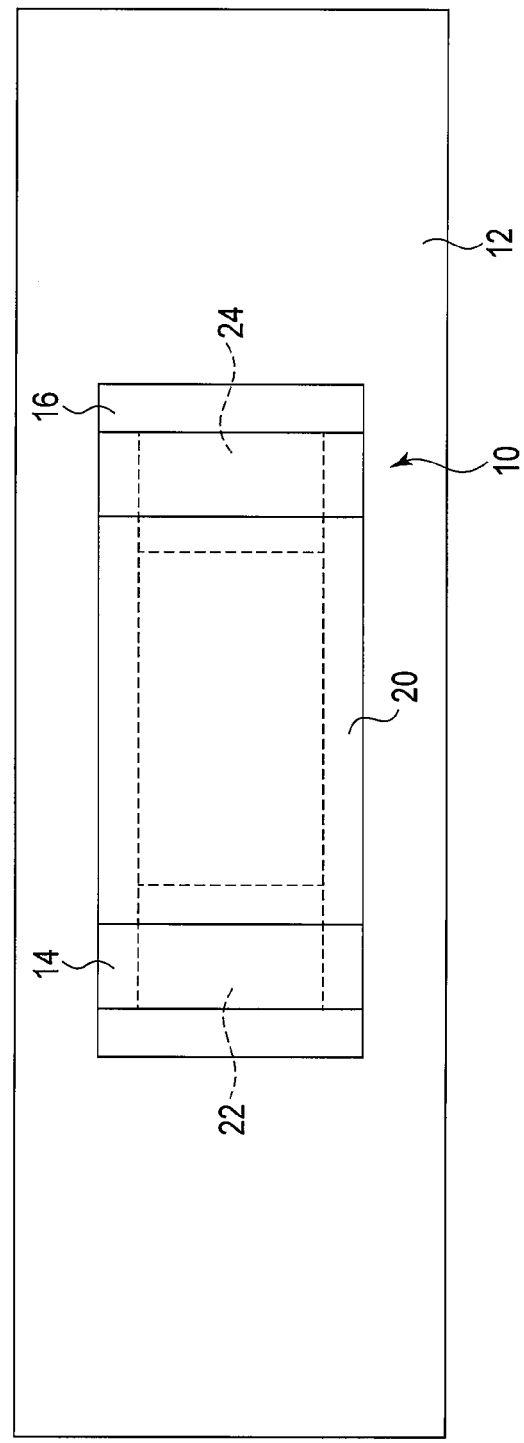

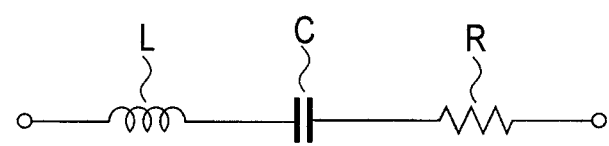
F I G. 2A
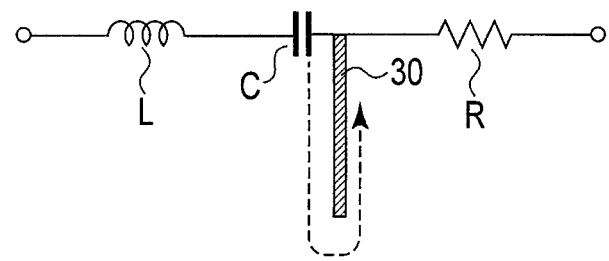
F I G. 2B

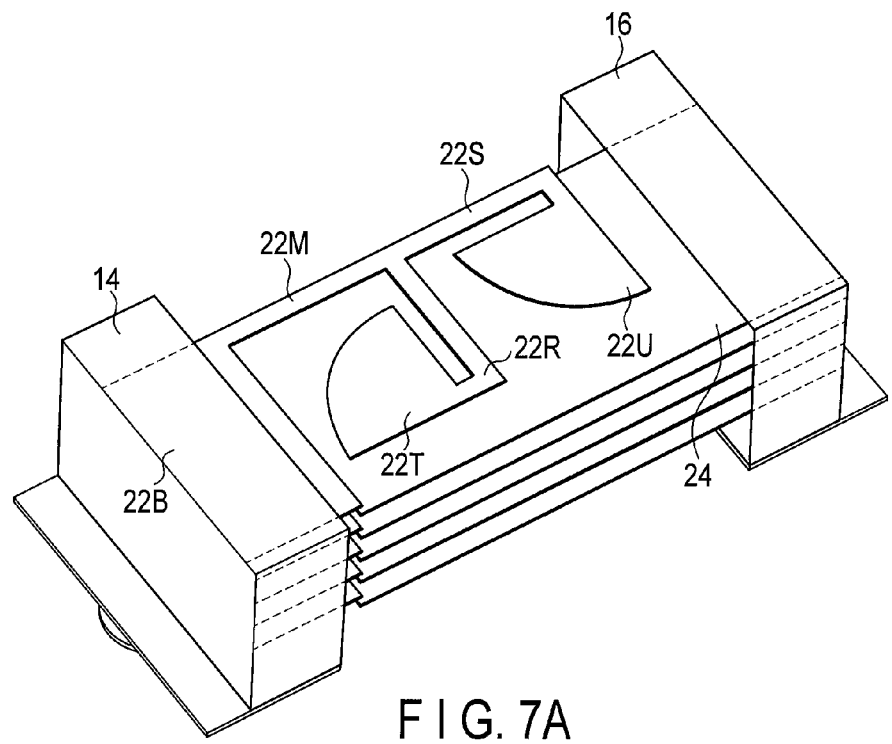
F I G. 7A
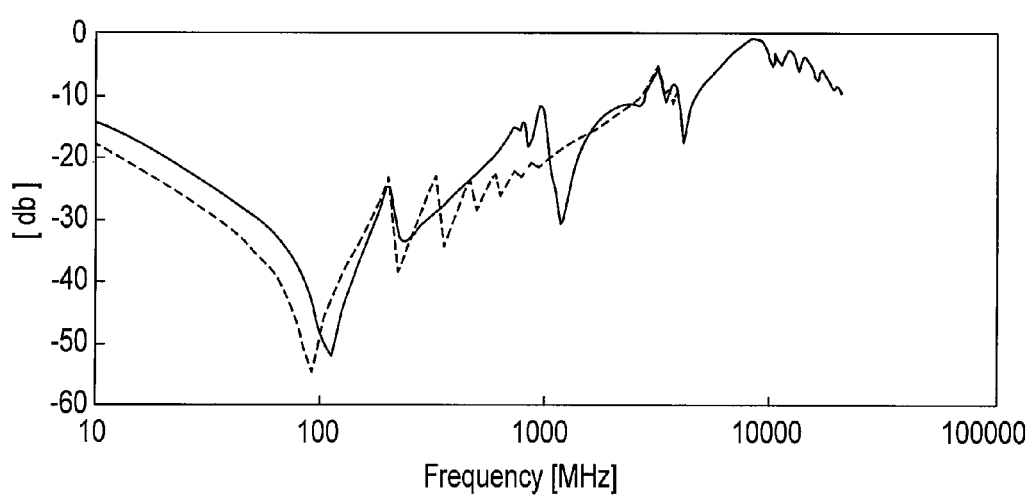
F I G. 7B

US 9,620,289 B2

CERAMIC CAPACITOR FOR SUPPRESSING HIGH-FREQUENCY NOISE

CROSS-REFERENCE TO RELATED APPLICATIONS

This application claims the benefit of U.S. Provisional Application No. 61/909,802, filed Nov. 27, 2013, the entire contents of which are incorporated herein by reference.

FIELD

Embodiments described herein relate generally to a ceramic capacitor for suppressing high-frequency noise.

BACKGROUND

As a capacitor (also referred to as a condenser), a laminated ceramic capacitor is known and is mounted on a high-frequency circuit board. The laminated capacitor comprises ceramic dielectric layers of titanium oxide, barium titanate or the like and plate-like electrodes, for example, nickel electrodes. This laminated capacitor has a structure in which the plate-like electrodes are alternately stacked so as to be opposed to each other with the dielectric layers interposed between them. Since the dielectric layers comprise ceramic having a high dielectric constant, the ceramic capacitor has great capacitance in spite of a simple structure. Thus, the ceramic capacitor exhibits good high-frequency performance, and is used mainly as measures against noise in a circuit board of electrical equipment comprising an IC module.

An electrical path of the ceramic capacitor takes a simple shape. Thus, the longer the electrical path length is, the more an equivalent series inductance ESL, also referred to as a parasitic inductance, tends to be increased. Thus, to improve a high-frequency characteristic in the ceramic capacitor, a technique of reducing the electrical path length of the capacitor has been applied. For example, of capacitors whose planar shapes are formed in rectangular shapes, in each of a flip (LW inversion) type capacitor in which electrode terminals are provided on long sides, not short sides, a three-terminal capacitor in which the numbers of electrodes and terminals are increased, and the like, it is supposed that the distance between terminals is reduced and an electrical path length is shortened. However, there is a limit to reduction of sizes, and it is assumed to be difficult to further improve a high-frequency characteristic only by the above technique. In addition, the capacitors of the above-described examples do not have the same shape as that of a conventional two-terminal capacitor pad with terminals provided on short sides. Thus, it is difficult to conduct a replacement experiment on a product circuit board, and they are hard to use in a real product.

As described above, in electrical equipment, although a capacitor is disposed for suppressing noise, an ESL (parasitic inductance) of the capacitor becomes problematic at high frequency, and there is a risk that the capacitor's effect of reducing noise might not be exhibited. Against such a background, the development of a capacitor with an improved high-frequency characteristic is desired.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1A is a side sectional view showing a schematic structure of a laminated ceramic capacitor according to the embodiments;

FIG. 1B is a plan view showing a schematic electrode disposition in the laminated capacitor shown in FIG. 1A;

FIG. 2A is a circuit diagram showing an equivalent circuit in the laminated capacitor according to a comparison example which has the structure shown in FIGS. 1A and 1B;

FIG. 2B is a circuit diagram showing an equivalent circuit in the laminated capacitor according to the embodiments which has the structure shown in FIGS. 1A and 1B;

FIG. 7A is a perspective view showing in perspective an internal electrode structure of a laminated ceramic capacitor according to a fifth embodiment;

FIG. 7B is a graph showing a frequency characteristic in the laminated capacitor shown in FIG. 7A;

DETAILED DESCRIPTION

Figure 3A:
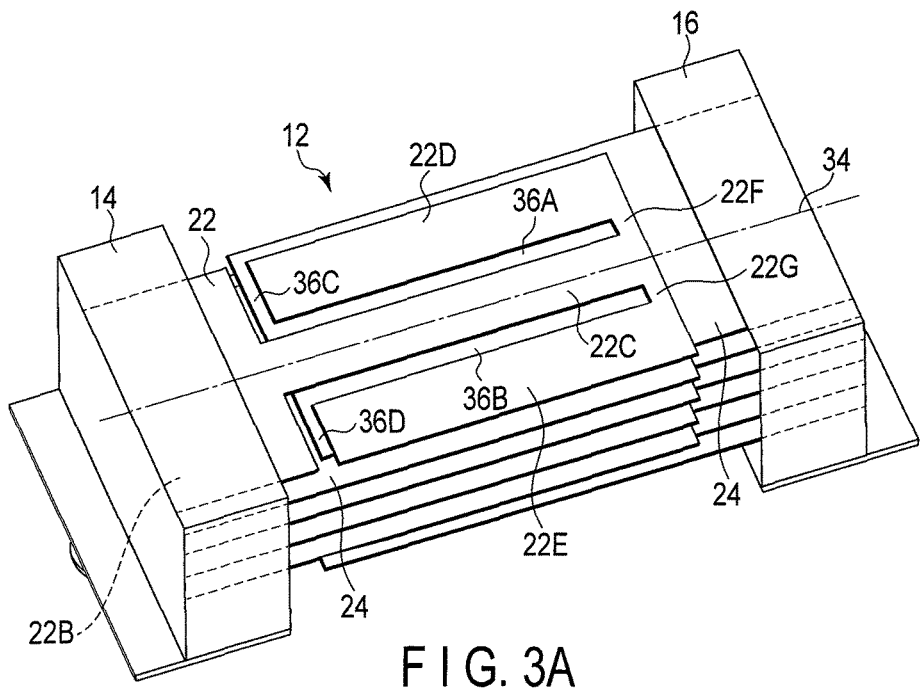
FIG. 3A is a perspective view showing in perspective an internal electrode structure of a laminated ceramic capacitor according to a first embodiment.

A laminated ceramic condenser according to various embodiments will be hereinafter described with reference to the accompanying drawings.

The laminated capacitor according to the embodiments comprises a first external electrode to be grounded, a second external electrode to which a voltage signal is to be applied, dielectric layers stacked between the first and second internal electrodes, and first and second internal electrode layers which are alternately disposed between the dielectric layers and comprise a laminated capacitor structure. In the laminated capacitor, each of the first internal electrode layers comprises a first base portion connected and fixed to the first external electrode, and is extended from the first base portion toward the second external electrode between the dielectric layers; each of the second internal electrode layers comprises a base portion connected and fixed to the second external electrode, and is extended from the second external electrode toward the first external electrode between the dielectric layers. The second internal electrode layer is formed in such a deformation pattern as allows a greater path length than a length between the first and the second external electrode opposed to each other. By this deformation pattern, an open stub which generates open stub resonance is formed in an equivalent circuit of the laminated capacitor.

FIGS. 1A and 1B show a schematic structure of a laminated ceramic capacitor 12 provided on a circuit board 10 according to the embodiments. This capacitor (also referred to as a condenser) 12 is formed in a substantially rectangular parallelepiped shape. On both sides in a longitudinal direction, a voltage-signal-side external electrode block (hereinafter, referred to merely as a V external electrode block) 14 to which a voltage signal or a current signal (hereinafter, referred to merely as a voltage signal) is applied, and a ground-side external electrode block 16 (hereinafter, referred to merely as a G external electrode signal) which is connected to (grounded on) a ground are disposed, respectively, to be opposed to each other. Between the V external electrode block 14 and the G external electrode block 16, dielectric layers 20 are stacked, signal-side internal electrodes (hereinafter, referred to merely as V internal electrodes) 22 and ground-side internal electrodes (hereinafter, referred to merely as G internal electrodes) 24 are extended from the V electrode terminal 14 and the G electrode terminal 16 between the dielectric layers 20, and the V internal electrodes 22 and the G internal electrodes 24 are stacked alternately with the dielectric layers 20 interposed between them. Here, the dielectric layers 20 are made of ceramics such as titanium oxide or barium titanate, and the V internal electrodes 22 and the G internal electrodes 24 are made of copper or nickel.

The V internal electrodes 22, whose base portions are connected and fixed to the V external electrode block 14, are extended toward the G external electrode block 16. Similarly, the G internal electrodes 24, whose base portions are connected and fixed to the G external electrode block 16, are extended toward the V external electrode block 14. Free ends (tips) of the G internal electrodes 24 extended to the side of the V external electrode block 14 are electrically isolated from the V external electrode block 14 by the dielectric layers 20. Similarly, free ends (tips) of the V internal electrodes 22 extended to the side of the G external electrode block 16 are electrically isolated from the G external electrode block 16 by the dielectric layers 20. Here, the V external electrode block 14 comprises a C-shaped holding block (not shown in the figures) which surrounds and holds the laminated structure of the dielectric layers 20 and the V internal electrodes 22 and is made of copper or nickel, and a nickel-plated covering layer (not shown in the figures) which covers the holding block. Similarly, the G external electrode block 16 comprises a C-shaped holding block (not shown in the figures) which surrounds and holds the laminated structure of the dielectric layers 20 and the G internal electrodes 24 and is made of copper or nickel, and a nickel-plated covering layer (not shown in the figures) which covers the holding block.

The V internal electrodes 22 are, as will be described later as the various embodiments, not merely formed in plate-like or laminated electrodes having flat rectangular shapes, but are formed in patterns which allow greater path lengths than those of a flat rectangular plane and moreover have bending lines which generate reflection of a voltage signal. By this structure, in the capacitor shown in FIGS. 1A and 1B, the internal electrodes 22 are allowed greater path lengths than the length between the external electrode blocks 14 and 16 opposed to each other, and based on reflection of a voltage signal, open stub resonance by which cancellation of a voltage signal in a resonant voltage occurs is generated. That is, the V internal electrodes 22 of the capacitor structure are allowed greater path lengths than the length between the external electrode blocks 14 and 16 opposed to each other, and based on occurrence of reflection of a voltage signal in the V internal electrodes 22, open stub resonance by which cancellation of a voltage signal in a resonant voltage occurs is generated. The V internal electrodes 22 of the capacitor structure are used not merely as paths of electricity of the capacitor, but as bending lines premised on reflection of a signal, and the electrode shapes (patterns) of the capacitor are changed in accordance with a frequency to be associated with.

More specifically, the V internal electrodes 22 and the G internal electrodes 24 are both formed in rectangular flat electrode plates (electrode layers), and are stacked alternately with the dielectric layers 20 interposed between them. In a capacitor structure according to a comparison example, as shown in FIG. 2A, not only a capacitor C is formed by the capacitor structure, but also a resistor R and an inductor (parasitic inductor) L are formed by the capacitor structure. The inductor (parasitic inductor) L is called an equivalent series inductance (ESL), and, as already described, is also regarded as a factor in not being able to reduce noise at high frequency. In contrast, in the various embodiments which will be described hereinafter, of the V internal electrodes 22 and the G internal electrodes 24, at least the V internal electrodes 22 are not formed in rectangular flat electrode plates (electrode layers), and the electrode shapes (patterns) are changed in deformed patterns such as folded patterns, spiral patterns or tapestry patterns in accordance with a frequency of a high-frequency wave to be suppressed. The deformed patterns of the V internal electrodes 22 are further changed to comprise narrow portions 22C to 22G which are determined more narrowly than others in a waveguide of a signal voltage. Thus, as shown in FIG. 2B, in the capacitor structure according to the embodiments in which the patterns of the V internal electrodes 22 are changed, an open stub 30 by which a voltage signal is reflected in the V internal electrodes 22 and open stub resonance occurs is formed in a circuit in which the capacitor C, the resistor R and the inductor L are connected in series. Since a stub circuit is provided in a line itself, cancellation of a signal at a specific frequency occurs when current is applied to the stub circuit and is reflected and returned. Whether cancellation of a signal can occur is closely related to a frequency (wavelength). At the time when a signal is reflected and returned, if a next signal is in antiphase, that is, if a stub line is a quarter the wavelength $\lambda$, cancellation occurs. However, not only in a case where the stub line is set at one quarter the wavelength $\lambda$, in an actual capacitor, it is preferable that the stub line is set in the range of ($\frac{1}{4} \pm \delta$) the wavelength.

In general, in a stub circuit, if the length of a stub resonance portion is set at a quarter wavelength, resonance of the lowest frequency occurs. However, according to simulations of the following embodiments, a point to be counted as a starting point of a stub is changed, and thus a calculation result is changed. For example, in an eighth embodiment which will be described later, a stub resonant frequency is changed to be doubled. Also from this, it is preferable that the stub line is set in the range of (¼±8) the wavelength on the basis of the various simulations.

In the following various embodiments, the internal electrodes are formed in various shapes. In all cases, a capacitor structure having a structure which appears to be a stub from a circuit in which the internal electrodes themselves of the capacitor are mounted is improved.

The forms of the internal electrodes can be determined such that open stub resonance corresponds to a high-frequency component of noise to be suppressed, and a capacitor structure whose high-frequency characteristic is improved can be achieved. Here, a setting of open stub resonance based on a pattern change of the V internal electrodes 22 can be confirmed by an electromagnetic field analysis based on the simulations.

A pattern change of the V internal electrodes 22 for generating open stub resonance is not limited to the case of providing a narrow portion 22A determined more narrowly than others in a waveguide of a signal voltage. The open stub resonance can be generated by pattern changes of the V internal electrodes 22 according to the various embodiments, which will be described hereinafter.

First Embodiment

FIG. 3A shows a laminated ceramic capacitor according to a first embodiment. It should be noted that FIG. 3A shows the capacitor structure excluding ceramic dielectric layers to simplify the figure. In addition, it is also should be noted that in FIG. 3A and the following figures, the same signs as those shown in FIG. 1A and FIG. 1B indicate the same parts or the same portions as those shown in FIG. 1A and FIG. 1B.

Each of the V internal electrodes 22 is disposed on each of the G internal electrodes 24 to be opposed to the G internal electrode 24, and comprises a rectangular base portion 22B which is connected and fixed to the electrode block 14. In the V internal electrode 22, from the center of the rectangular base portion 22B along a longitudinal-direction central line 34 of the V internal electrode 22, the center strip portion 22C having a width less than one third the width of the base portion 22B is extended toward the G external electrode block 16 to the front of the G external electrode block 16. On both sides of the center strip portion 22C, the both-side strip portions 22D and 22E are disposed parallel to one another to leave gaps 36A and 36B. The base portions of the both-side strip portions 22D and 22E are jointed to the strip portion 22C by the narrow strip joint portions 22F and 22G which are narrower than the strip portions 22C, 22D and 22E on the side of the G external electrode block 16. The opposite sides of the base portions of the strip portions 22D and 22E are formed as free ends, and the free ends are opposed by an end portion of the rectangular base portion 22B to leave gaps 36C and 36D.

In the capacitor structure shown in FIG. 3A, since a path of a voltage signal from the rectangular base portion 22B to the free ends of the strip portions 22D and 22E of the V internal electrode 22 is folded, a signal path can be made greater than the distance between the electrode blocks 14 and 16 as compared to that of the V internal electrode 22 which is merely flat. In addition, since the signal path is provided with the narrow strip joint portions 22F and 22G, a stub resonant circuit which resonates at high frequency can be created. Thus, in the structure shown in FIG. 3A, a capacitor characteristic can be improved in a high frequency band as shown in FIG. 3B.

Figure 3B:
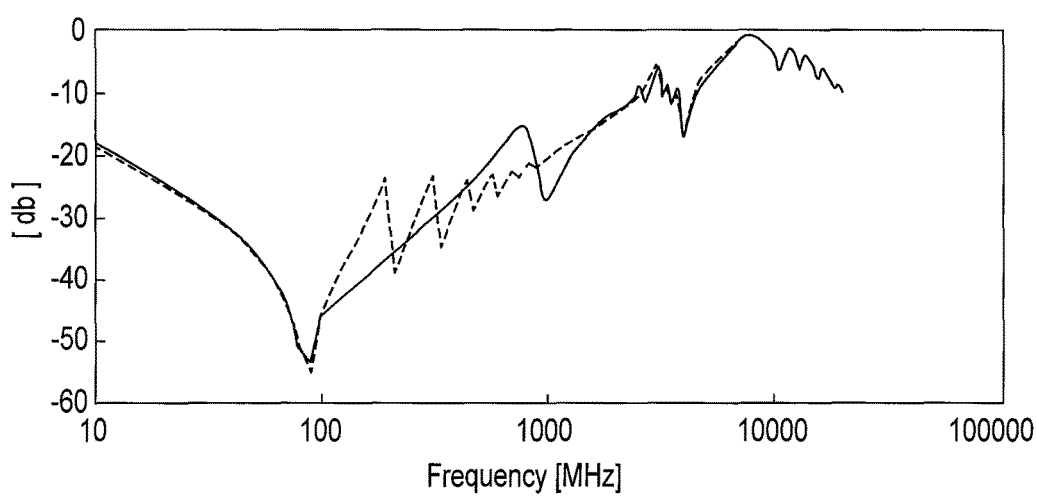
FIG. 3B is a graph showing a frequency characteristic in the laminated capacitor shown in FIG. 3A.

A characteristic shown in FIG. 3B is an S-parameter of S12 at the time of measuring the capacitor in a two-terminal shunt mode. The horizontal axis represents a frequency and the vertical axis represents dB value. If the graph falls, a pass characteristic of noise is low, and thus a capacitor characteristic is good.

According to the capacitor structure in the first embodiment, a characteristic indicated by the solid line in FIG. 3B can be obtained. In FIG. 3B, the broken line indicates a characteristic in the capacitor structure according to the comparison example in which the above-described V internal electrode 22 is formed in a simply flat rectangular shape. In the characteristic indicated by the solid line in FIG. 3B, since the internal electrode length (signal path) of the V internal electrode 22 is great, an attenuation effect occurs around 1 GHz as well as around 100 MHz. It is supposed to be difficult to achieve such an attenuation effect in a gigahertz band in an ordinary capacitor structure. Also from this, it can be assumed to be effective to create a stub resonant circuit in the structure shown in FIG. 3A.

Second Embodiment

Figure 4A:
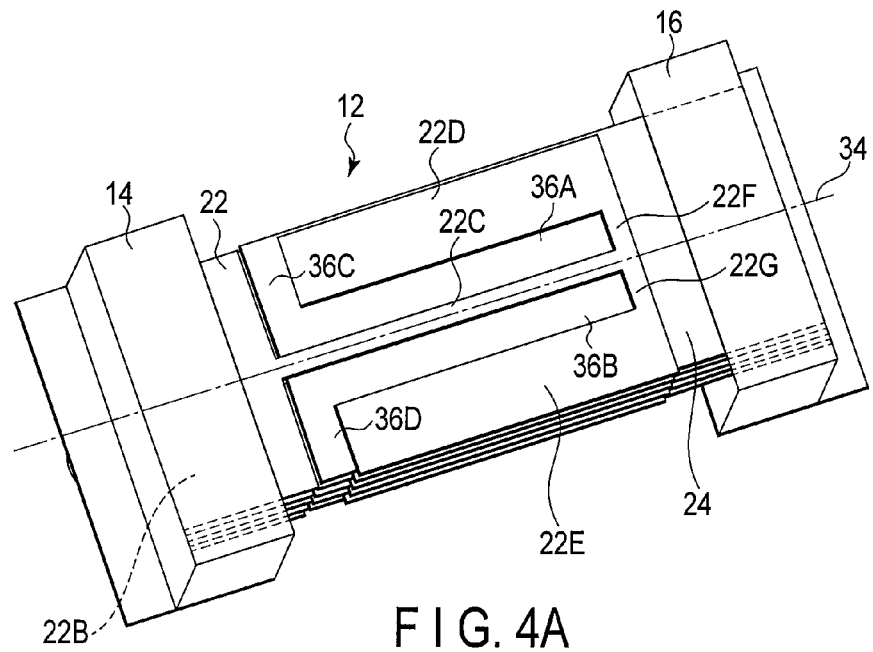
FIG. 4A is a perspective view showing in perspective an internal electrode structure of a laminated ceramic capacitor according to a second embodiment.

In a second embodiment shown in FIG. 4A, which is related to a modification of the first embodiment shown in FIG. 3A, the rectangular base portion 22C is formed to have a smaller width and the strip portions 22D and 22E are formed to have a greater width than those of the V internal electrode 22 shown in FIG. 3A.

Figure 4B:
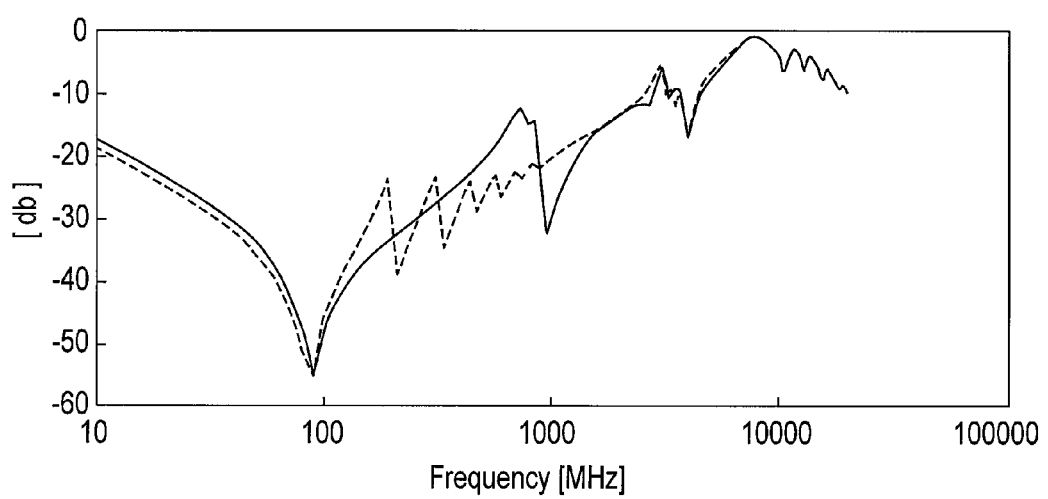
FIG. 4B is a graph showing a frequency characteristic in the laminated capacitor shown in FIG. 4A.

According to a capacitor structure in the second embodiment, a characteristic indicated by the solid line in FIG. 4B can be obtained. In FIG. 4B, similarly, the broken line indicates a characteristic in the capacitor structure according to the comparison example in which the above-described V internal electrode 22 is formed in a simply flat rectangular shape. In the characteristic indicated by the solid line in FIG. 4B, since the internal electrode length (signal path) of the internal electrode 22 is great, an attenuation effect occurs around 1 GHz as well as around 100 MHz. Here, in the capacitor structure shown in FIG. 4A, the ratio of width of the V internal electrode 22 shown in FIG. 3A is varied. Since dimensions are set differently, greater attenuation occurs around 1 GHz as shown in FIG. 4B.

Third Embodiment

Figure 5A:
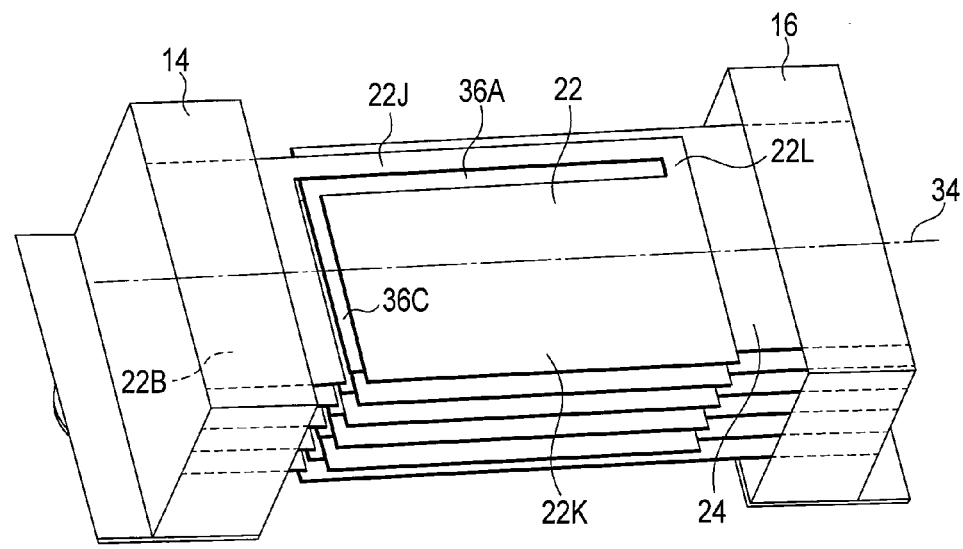
FIG. 5A is a perspective view showing in perspective an internal electrode structure of a laminated ceramic capacitor according to a third embodiment.

In a third embodiment shown in FIG. 5A, unlike in the first embodiment shown in FIG. 3A, in the V internal electrode 22, the central strip portion 22C is not provided, and a side strip portion 22J which is formed to have a smaller width than that of the base portion 22B is provided not at the center but at a side of the electrode structure, and is extended from a side end of the base portion 22B along the central line 34. In addition, in the V internal electrode 22, an electrode portion 22K which is smaller than the base portion 22B, has a greater width than that of the side rectangular base portion 22J and has a greater area than those of the portions 22D and 22E shown in FIGS. 3A and 4A, is provided and is joined to the side rectangular base portion 22J by the narrow strip joint portion 22L. Between the electrode portion 22K and the side rectangular base portion 22J, the strip-shaped gap 36A is provided along the central line 34. In addition, the gap 36C, which connects with the gap 36A and forms an L-shape with the gap 36A, is provided between a free end of the electrode portion 22K and the base portion 22B. The electrode portion 22K is electrically isolated from the G external electrode block 16 on the side of the G external electrode block 16. Also in the capacitor structure in the third embodiment, the V internal electrode 22 has a greater signal line length than the distance between the electrode blocks 14 and 16.

Figure 5B:
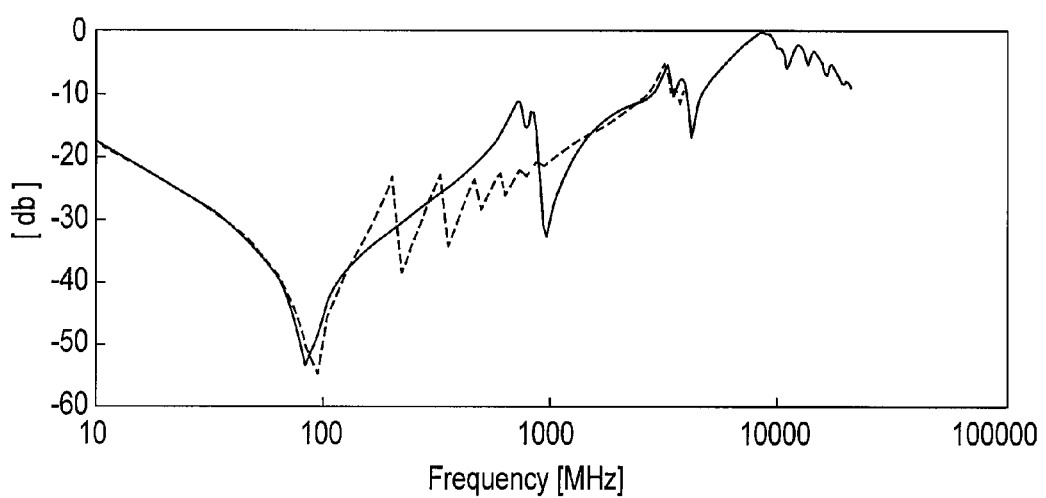
FIG. 5B is a graph showing a frequency characteristic in the laminated capacitor shown in the FIG. 5A.

Also in the capacitor structure in the third embodiment, a characteristic indicated by the solid line in FIG. 5B can be obtained. In FIG. 5B, the broken line indicates a characteristic in the capacitor structure according to the comparison example in which the above-described V internal electrode 22 is formed in a simply flat rectangular shape. In the characteristic indicated by the solid line in FIG. 5B, as shown in FIG. 3B, since the internal electrode length (signal path) of the V internal electrode 22 is great, an attenuation effect occurs around 1 GHz as well as around 100 MHz. Thus, it can be assumed to be effective to create a stub resonant circuit also in the structure shown in FIG. 5A.

Fourth Embodiment

Figure 6A:
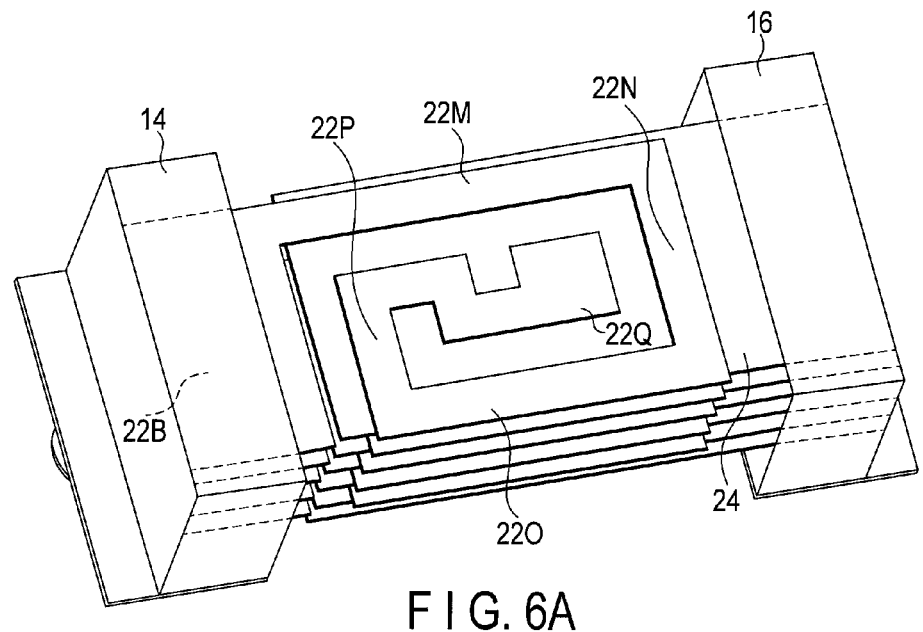
FIG. 6A is a perspective view showing in perspective an internal electrode structure of a laminated ceramic capacitor according to a forth embodiment.

In a fourth embodiment shown in FIG. 6A, unlike in the first embodiment shown in FIG. 3A, the V internal electrode 22 is not provided with the central strip portion 22C and is formed in a pattern in which rectangular strips having the same width are bent. That is, a side strip portion 22M, which is formed to have a smaller width than that of the base portion 22B, is provided not at the center but at a side of the electrode structure, and is extended from a side end of the base portion 22B. In addition, the side strip portion 22M is bent to form a front strip portion 22N in the front of the G external electrode block 16, and the front strip portion 22N is extended to the front of the G external electrode block 16. Moreover, the front strip portion 22N is bent to form a side strip portion 22O, and the side strip portion 22O is, similarly to the side strip portion 22M, provided at the other side. Furthermore, the side strip portion 22O is folded to form a strip portion 22P, and moreover, a strip portion 22Q is extended from the strip portion 22P. The V internal electrode 22 is thus formed in a folded pattern in which the strip portions 22M to 22Q are jointed.

In the capacitor structure shown in FIG. 6A, since a path of a voltage signal from the base portion 22B to a free end of a strip portion 22Q of the V internal electrode 22 is folded, a signal path can be made longer than the distance between the electrode blocks 14 and 16 as compared to that of the V internal electrode 22 which is simply flat. Therefore, a stub resonant circuit which resonates at high frequency can be created. Thus, in the structure shown in FIG. 6A, a capacitor characteristic can be improved in a high-frequency band as shown in FIG. 6B.

Figure 6B:
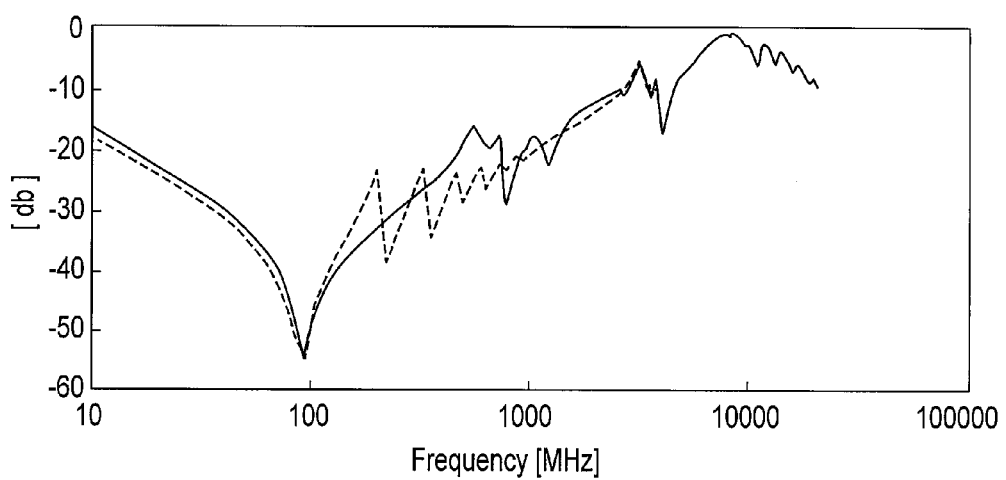
FIG. 6B is a graph showing a frequency characteristic in the laminated capacitor shown in FIG. 6A.

According to the capacitor structure in the fourth embodiment, a characteristic indicated by the solid line in FIG. 6B can be obtained. In FIG. 6B, similarly, the broken line indicates a characteristic in the capacitor structure according to the comparison example in which the above-described V internal electrode 22 is formed in a simply flat rectangular shape. In the characteristic indicated by the solid line in FIG. 6B, since the internal electrode length (signal path) of the V internal electrode 22 is set greater than that of the first embodiment, an attenuation effect occurs at two points around 1 GHz and at one point around 8 GHz as well as around 100 MHz. Thus, it can be assumed to be effective to create a stub resonant circuit in the structure shown in FIG. 6A. Moreover, points of frequency at which resonance occurs can be increased by making the internal electrode length (signal path) of the V internal electrode 22 greater.

Fifth Embodiment

In a fifth embodiment, as shown in FIG. 7A, the side strip portion 22M is extended from a side end of the base portion 22B in a longitudinal direction, and on the way branches into a side strip portion 22S extending as it is and a strip portion 22R which is bent and extends along a short-side direction. In the two regions on the G internal electrode 24 partitioned by the strip portion 22R, sector portions 22U and 22T having the same size are disposed, and the base portions of the sector portions 22T and 22U are jointed to the strip portions 22M and 22S, respectively. Here, signal paths which branch from the the side strip portion 22M to free ends of the sector portions 22T and 22U have signal path lengths equal to each other.

In the capacitor structure shown in FIG. 7A, since a path of a voltage signal from the base portion 22B to the free end of the sector portions 22T and 22U of the V internal electrode 22 is folded, a signal path can be made longer than the distance between the electrode blocks 14 and 16 as compared to that of the V internal electrode 22 which is simply flat, and a stub resonant circuit which resonates at high frequency can be created. Thus, in the structure shown in FIG. 6A, the capacitor characteristic can be improved in a high-frequency band as shown in FIG. 6B.

According to the capacitor structure in the fifth embodiment, a characteristic indicated by the solid line in FIG. 7B can be obtained. In FIG. 7B, similarly, the broken line indicates a characteristic in the capacitor structure according to the comparison example in which the above-described V internal electrode 22 is formed in a simply flat rectangular shape. In the characteristic indicated by the solid line in FIG. 7B, since the V internal electrode 22 has a branch shape and a branch internal electrode length (signal path) is great, an attenuation effect occurs around 1 GHz and around 8 GHz. Thus, it can be assumed to be effective to create a stub resonant circuit in the structure shown in FIG. 7A. Moreover, since the internal electrode portions 22T and 22U are not always rectangular, and can also have a deformed flat planar shape such as a sector, various shapes can be assumed as an electrode shape.

Sixth Embodiment

Figure 8A:
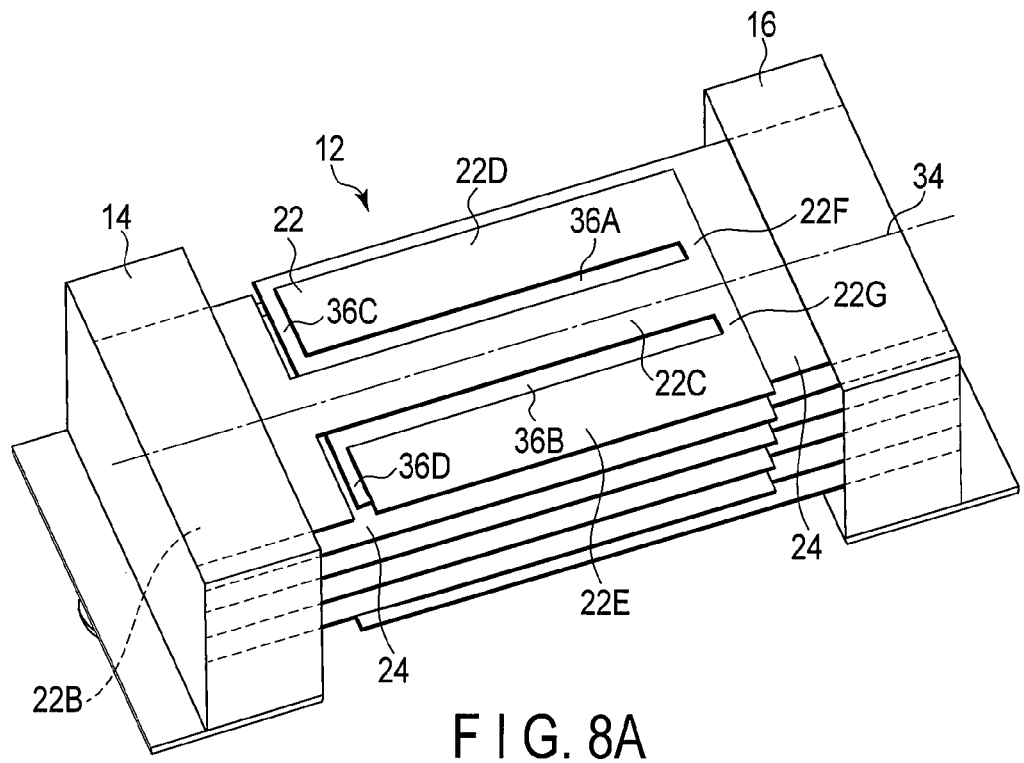
FIG. 8A is a perspective view showing in perspective an internal electrode structure of a laminated ceramic capacitor according to a sixth embodiment.

In a sixth embodiment, as shown in FIG. 8A, the V internal electrode 22 has the same pattern as that of the first embodiment shown in FIG. 3A. Thus, regarding a form of the V internal electrode 22, refer to the description concerning the first embodiment. In contrast to the V internal electrode 22, as shown in FIG. 8A, the G internal electrode 24 has a pattern in which strip portions 24D and 24E opposed to the strip portions 22D and 22E of the V internal electrodes 22 are extended from a rectangular base portion 24B. Between the strip portions 24D and 24E, both sides of the capacitor structure are extended to leave a strip-shaped gap 38C, and the free ends of them are extended to provide gaps 38D and 38E to and from the V external electrode block 14 to the front of the V external electrode block 14.

Figure 8B:
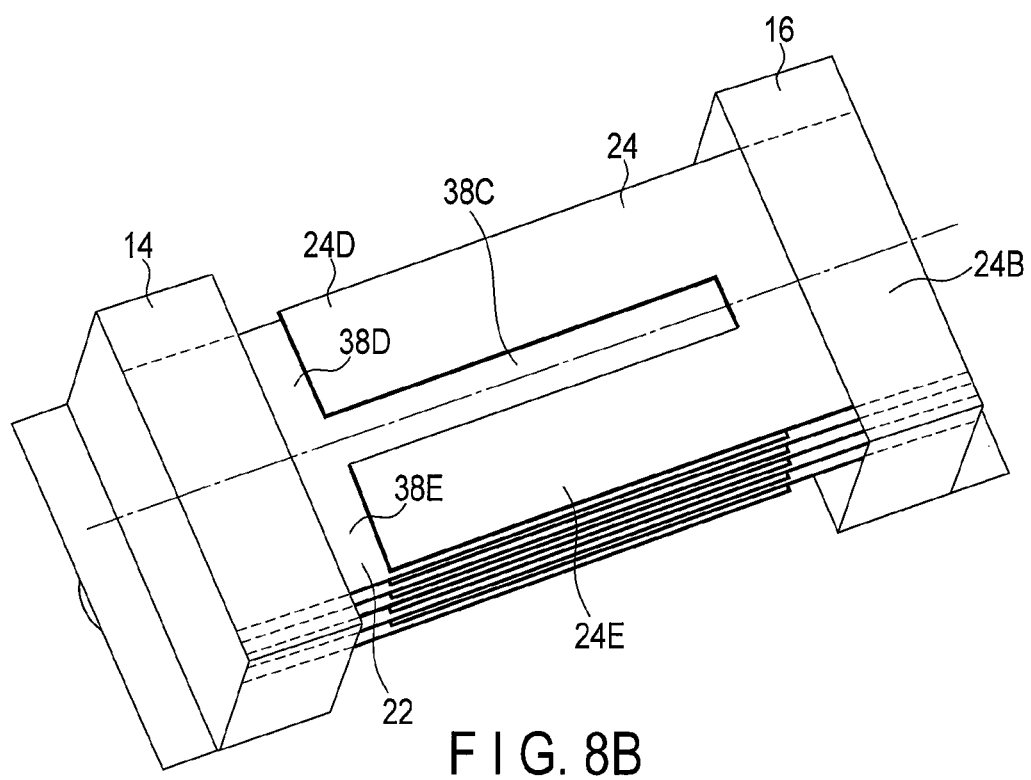
FIG. 8B is a perspective view showing in perspective the internal electrode structure of the laminated ceramic capacitor excluding V internal electrodes in FIG. 8A.
Figure 8C:
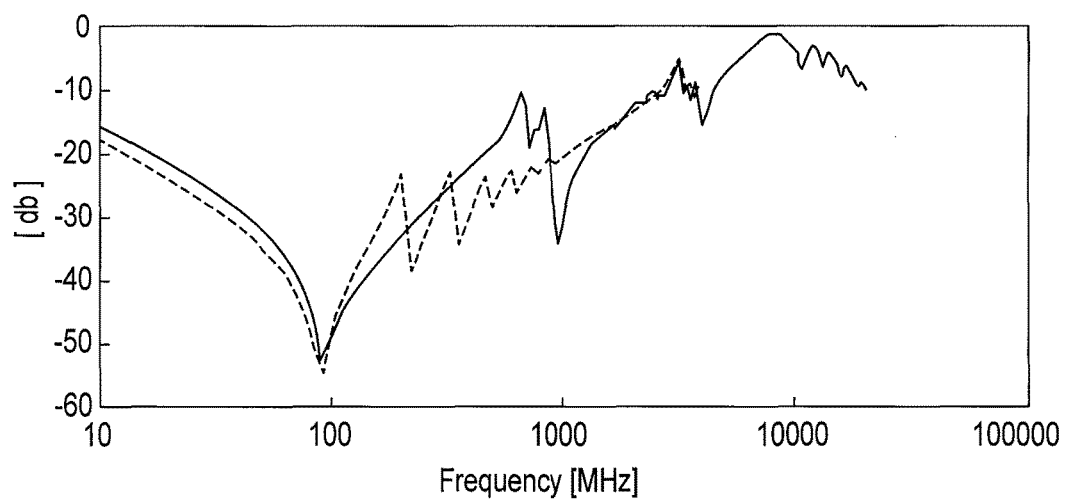
FIG. 8C is a graph showing a frequency characteristic in the laminated capacitor shown in FIG. 8A and FIG. 8B.

According to the capacitor structure in the sixth embodiment, a characteristic indicated by the solid line in FIG. 8C can be obtained. In FIG. 8C, similarly, the broken line indicates a characteristic in the capacitor structure according to the comparison example in which the above-described V internal electrode 22 is formed in a simply flat rectangular shape. In the characteristic indicated by the solid line in FIG. 8C, the V internal electrode 22 has a branch shape, a branch internal electrode length (signal path) is greater than the distance between the electrode blocks 14 and 16, and the G internal electrode 24 comprises the strip portions 24D and 24E corresponding to the strip portions 22D and 22E. Thus, an attenuation effect occurs around 1 GHz and around 8 GHz. Since the gap 38C is provided between the strip portions 24D and 24E, an attenuation effect around 1 GHz is greater than those of the other embodiments. Thus, it can be assumed that to create a stub resonant circuit in the capacitor structure shown in FIG. 8A and FIG. 8B is effective and its attenuation effect of a high-frequency can be made great.

Seventh Embodiment

Figure 9A:
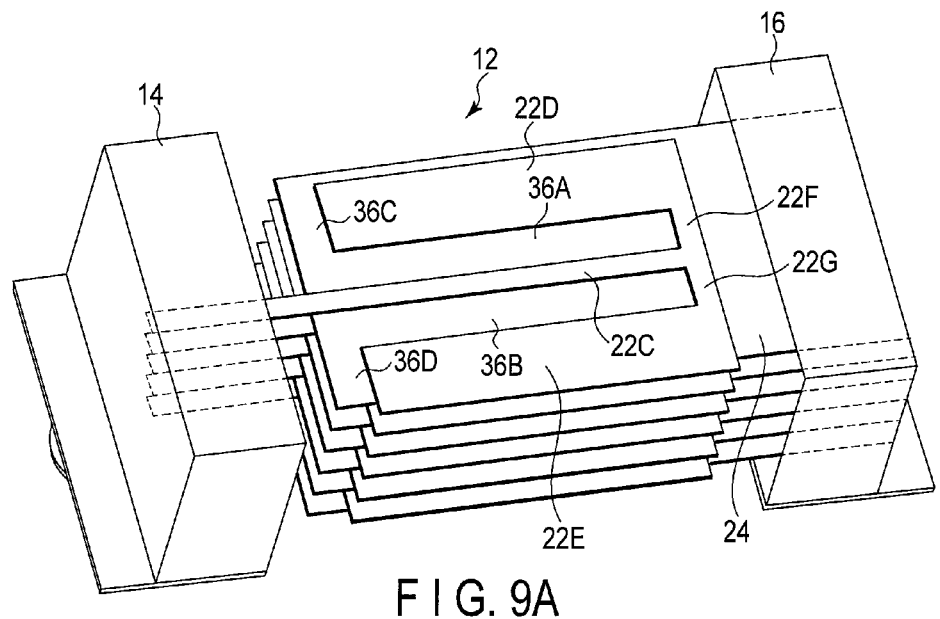
FIG. 9A is a perspective view showing in perspective an internal electrode structure of a laminated ceramic capacitor according to a seventh embodiment.

In a seventh embodiment, as shown in FIG. 9A, the V internal electrode 22 does not comprise the rectangular base portion 22B, and the central strip portion 22C is extended toward the electrode block 14 and is connected and fixed directly to the electrode block 14. Except for the base portion 22B and the central strip portion 22C, the V internal electrode 22 is formed in a pattern having the same shape as that of the first embodiment shown in FIG. 3A.

Figure 9B:
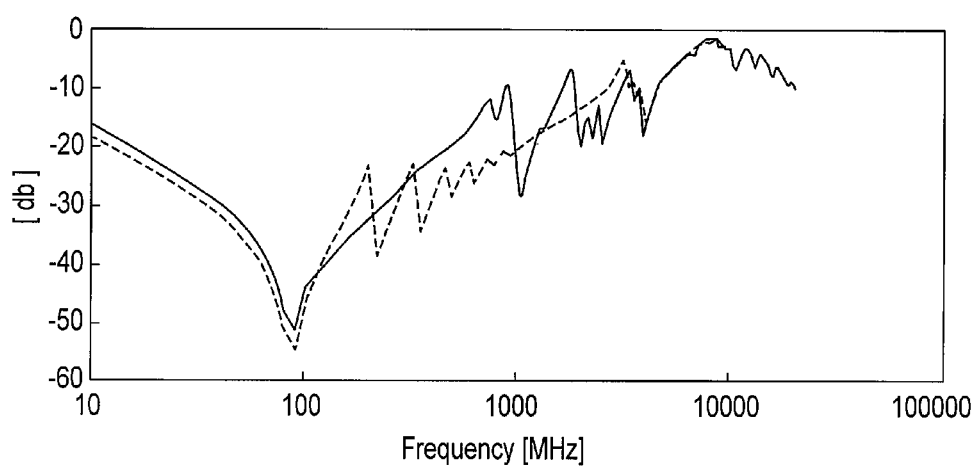
FIG. 9B is a graph showing a frequency characteristic in the laminated capacitor shown in FIG. 9A.

According to the capacitor structure in the seventh embodiment, a characteristic indicated by the solid line in FIG. 9B can be obtained. In FIG. 9B, similarly, the broken line indicates a characteristic in the capacitor structure according to the comparison example in which the above-described V internal electrode 22 is formed in a simply flat rectangular shape. In the characteristic indicated by the solid line in FIG. 9B, since the rectangular base portion 22B is not provided, the internal electrode length (signal path) of the V internal electrode 22 is great. Thus, an attenuation effect occurs around 1 GHz, 8 GHz and between them. Therefore, it can be assumed to be effective to create a stub resonant circuit in the capacitor structure shown in FIG. 9A. In the seventh embodiment, since the central strip portion 22C having a small width is passed through when a voltage signal enters the internal electrode from the external electrode 14, in other words, since an entrance of a signal to the capacitor structure is narrow, an effect of increasing inductance is small, but an attenuation effect of high frequency by the stub resonant circuit is generated. This indicates the following: the path to a capacitor may become long and inductance may be increased at the time of mounting the capacitor; however, in the structure shown in FIG. 9A, even in such a state, an attenuation effect can be exhibited as long as the signal path length in the capacitor structure is greater than the distance between the electrode blocks 14 and 16.

Eighth Embodiment

Figure 10A:
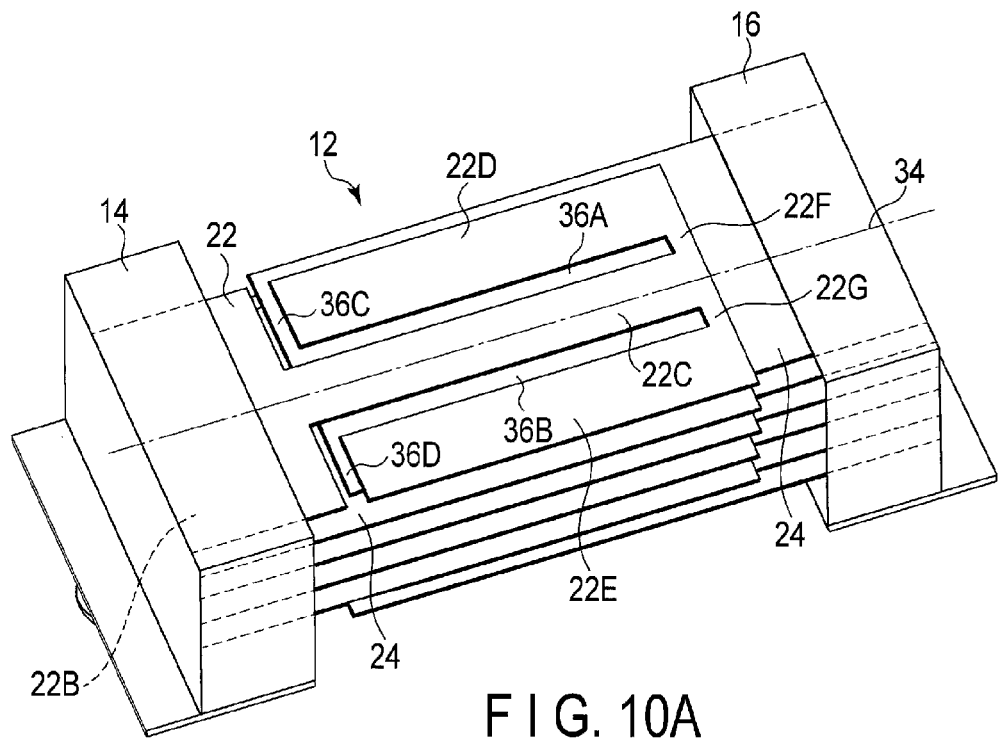
FIG. 10A is a perspective view showing in perspective an internal electrode structure of a laminated ceramic capacitor according to an eighth embodiment.
Figure 10B:
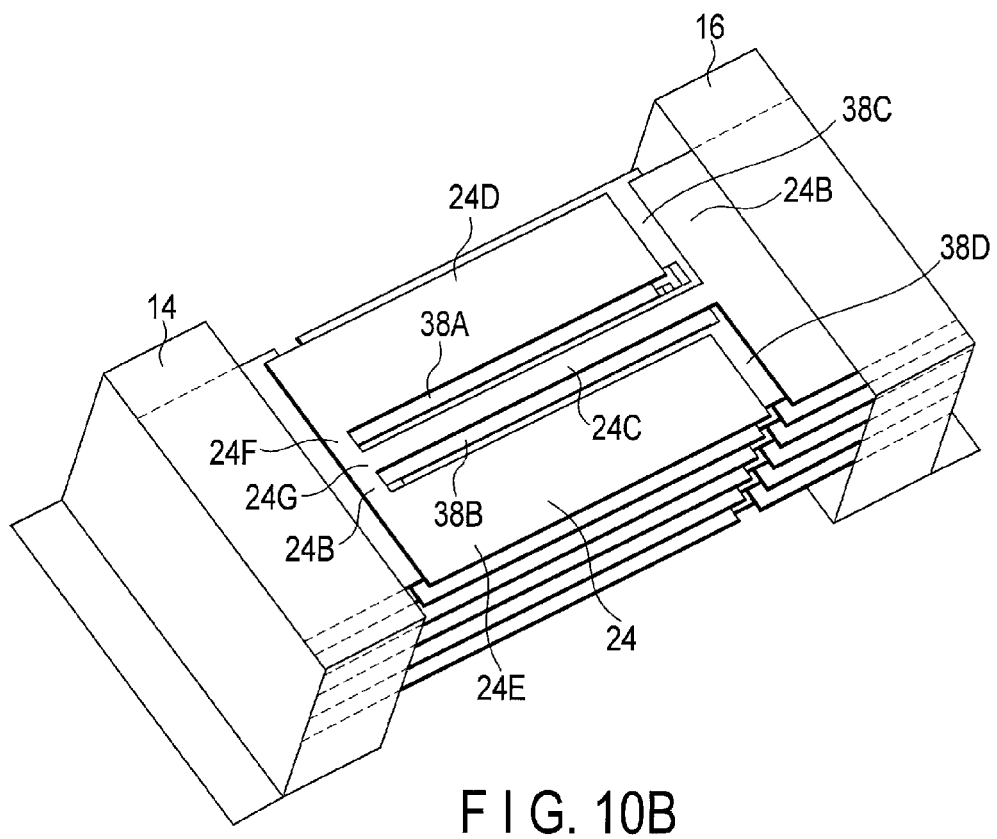
FIG. 10B is a perspective view showing in perspective the internal electrode structure of the laminated ceramic capacitor excluding V internal electrodes in FIG. 10A.

In an eighth embodiment, as shown in FIG. 10A, the V internal electrode 22 has the same pattern as that of the first embodiment shown in FIG. 3A. In addition, as shown in FIG. 10B, the G internal electrode 24 has the same shape as that of the V internal electrode 22, and is disposed as the V internal electrode 22 is rotated 180 degrees. That is, the G internal electrode 24 comprises the rectangular base portion 24B, and from the center of the base portion 24B along a longitudinal direction of the G internal electrode 24, the central strip portion 24C having a width less than one third the width of the base portion 22B is extended toward the V external electrode block 14 to the front of the V external electrode block 14. The both-side strip portions 24D and 24E are disposed parallel to one another to leave gaps 38A and 38B on both sides of the central strip portion 24C, and the base portions of the both-side strip portions 24D and 24E are jointed to the strip portion 24C by narrow strip joint portions 22F and 22G which are narrower than the strip portions 24C, 24D and 24E on the side of the V external electrode block 14. The opposite sides of the base portions of the strip portions 24D and 24E are formed as free ends, and the free ends are opposed by an end portion of the rectangular base portion 22B to leave the gaps 38C and 38D.

Figure 10C:
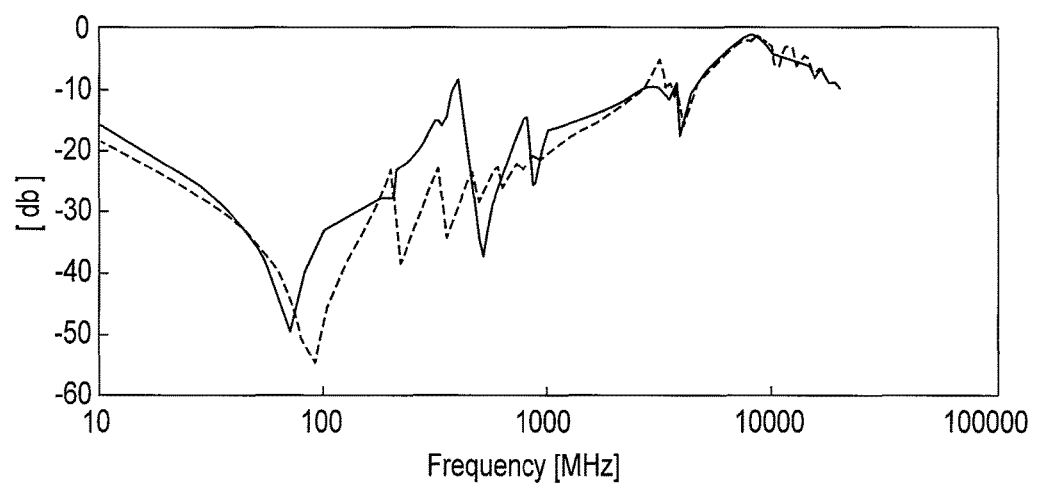
FIG. 10C is a graph showing a frequency characteristic in the laminated capacitor shown in FIG. 10A and FIG. 10B.

In the capacitor structure shown in FIG. 10A and FIG. 10B, since a path of a voltage signal from the rectangular base portion 22B to the free ends of the strip portions 22D and 22E of the V internal electrode 22 is folded, and similarly, a path of a voltage signal from the free ends of the strip portions 24D and 24E of the G internal electrode 24 to the rectangular base portion 24B of the G internal electrode 24 is folded, signal paths can be made longer than the distance between the electrode blocks 14 and 16 as compared to those of the V internal electrode 22 and G internal electrode 24 which are simply flat. In addition, since the signal paths are provided with the narrow strip joint portions 22F, 22G, 24F and 24G, a stub resonant circuit which resonates at high frequency can be created. Thus, in the structure shown in FIG. 10A and FIG. 10B, the capacitor characteristic can be improved in a high-frequency band as shown in FIG. 10C. In the graph of the solid line indicated in FIG. 10C, not only a stub resonant frequency of about 1000 MHz but a resonant frequency halved from about 1000 MHz to 500 MHz occurs. Thus, not only if the shape of the V internal electrode 22 is changed, but also if the shape of the G internal electrode 24 is changed, noise reduction can be exhibited at a changed stub resonant frequency.

In the above-described various embodiments, since a wiring itself of the capacitor is used as a line exhibiting a stub effect, there is also an advantage of being less influenced by mounting wiring.

In the above-described various embodiments, there is a correlation between a length of an electrode and a frequency at which stub resonance is exhibited. In the above various embodiments, a path of the internal electrode 22 in the third embodiment shown in FIG. 5A is the shortest, and a path of the internal electrode 22 in the fourth embodiment shown in FIG. 6A is the longest. However, as shown in FIG. 5B, a resonant frequency based on stub resonance in the third embodiment is set at the highest frequency as compared to those of the other embodiments, and as shown in FIG. 6B, a resonant frequency based on stub resonance in the fourth embodiment is set at the lowest frequency as compared to those of the other embodiments.

As is clear from the comparison example, it is supposed that a high-frequency characteristic of the capacitor according to the comparison example is poor and noise in a gigahertz band cannot be suppressed even if a plurality of capacitors are mounted on a board. However, according to the capacitor according to the embodiments, noise in a gigahertz band can also be suppressed. In particular, by suppressing noise of some characteristic in wireless technology (in LAN, 2.4 GHz and 5 GHz), a wireless communication characteristic can be improved.

As described above, according to the embodiments, a capacitor (condenser) which reduces noise in an intended band such as 2.4 GHz and 5 GHz can be provided.

While certain embodiments have been described, these are not limited to the scope as disclosed with respect to the above embodiments, and can be implemented by modifying the constituent elements without departing from the spirit thereof. In addition, various embodiments can be formed by an arbitrary combination of the plurality of constituent elements disclosed in the above-described embodiments. For example, some of the constituent elements disclosed in the embodiments may be deleted. Furthermore, the constituent elements of different embodiments may be arbitrarily combined.

What is claimed is:

1. A laminated capacitor comprising:
   a first external electrode configured to be grounded, the first external electrode is provided at a first side of the laminated capacitor;
   a second external electrode configured to be applied a voltage signal, the second external electrode is provided at a second side of the laminated capacitor that is opposite to the first side;
   dielectric layers each extended along a longitudinal direction of the laminated capacitor between the first external electrode and the second external electrode, the dielectric layers being disposed along a thickness direction of the laminated capacitor; and
   first and second internal electrode layers which are alternately disposed between the dielectric layers, the dielectric layers and the first and second internal electrode layers being stacked to form a laminated capacitor structure, wherein:
   each of the first internal electrode layers is extended along a longitudinal direction of the laminated capacitor, and having a first base portion connected and fixed to the first external electrode;
   each of the second internal electrode layers is extended along the longitudinal direction of the laminated capacitor, including:
      a first base portion connected and fixed to the second external electrode,
      a first central strip portion extended along the longitudinal direction from the base portion to a first common connecting portion,
      a first side strip portion extending along a first side of the first central strip portion, the first side strip portion includes a first free end located toward at a first base portion side and a first coupling end,
      a second side strip portion extending along a second side of the first central strip portion, the second side strip portion includes a second free end located toward at the first base portion side and a second coupling end, and
      a first coupling portion connecting the first coupling end of the first side strip portion and the second coupling end of the second side strip portion to the first common connecting portion of the first central strip portion,
      wherein the first central strip portion has a smaller width than either the first side strip portion or the second side strip portion,
      wherein the first central strip portion, the first coupling portion, the first side strip portion and the second side strip portion form a current path having a path length greater than a length between the first external electrode and the second external electrode.

2. The laminated capacitor of claim 1, wherein the first internal electrode layer comprises:
   a second base portion connected and fixed to the first external electrode,
   a second central strip portion which is opposed to the first central strip portion of the second internal electrode layer and which is extended along the longitudinal direction to a second common connecting portion,
   a third side strip portion and a fourth side strip portion which are opposed to the first side strip portion and the second side strip portion of the second internal electrode layer and which are extended along the longitudinal direction, having third and fourth free ends located at a second base portion side and first and second coupling ends, respectively, and
   a second coupling portion connecting the third side strip portion and the fourth side strip portion to the second common connecting portion of the second central strip portion, and
   the second central strip portion has a smaller width than those of the third and the fourth side strip portion.

3. The laminated capacitor of claim 1, wherein the first coupling portion has a smaller width than either the first side strip portion or the second side strip portion.

4. The laminated capacitor of claim 3, wherein the central strip portion of the second internal electrode layer has a smaller width than either the first side strip portion or the second side strip portion.

5. The laminated capacitor of claim 1, wherein the current path associated with each of the second internal electrode layers provides an open stub which generates open stub resonance is formed in an equivalent circuit in the capacitor.

6. A laminated capacitor comprising:
   a first external electrode configured to be grounded, the first external electrode is provided at a first side of the laminated capacitor;
   a second external electrode configured to be applied a voltage signal, the second external electrode is provided at a second side of the laminated capacitor that is opposite to the first side;
   dielectric layers each extended along a longitudinal direction of the laminated capacitor between the first external electrode and the second external electrode, the dielectric layers being disposed along a thickness direction of the laminated capacitor; and
   first and second internal electrode layers which are alternately disposed between the dielectric layers, the dielectric layers and the first and second internal electrode layers being stacked to form a laminated capacitor structure, wherein:
   each of the first internal electrode layers includes a first base portion connected and fixed to the first external electrode, and first and second strip portions separately extended along a longitudinal direction of the laminated capacitor and having first and second free ends located at the second external electrode,
   each of the second internal electrode layers is extended along the longitudinal direction of the laminated capacitor, includes:
      a second base portion connected and fixed to the second external electrode,
      a central strip portion extended along the longitudinal direction from the base portion to a common connecting portion,
      a third side strip portion extending along a first side of the central strip portion, the third side strip portion includes a third free end located toward at the second base portion side and a first coupling end,
      a fourth side strip portion extending along a second side of the central strip portion, the second side strip portion includes a fourth free end located toward at the second base portion side and a second coupling end, and a coupling portion connecting the first coupling end of the third side strip portion and the second coupling end of the fourth side strip portion to the common connecting portion of the central strip portion, wherein the first base portion and the first and second strip portions form first current paths having a first path length greater than a length between the first and the second external electrode, the central strip portion, wherein the coupling portion and first and second side strip portions form second current paths having a second path length greater than a length between the first and the second external electrode.

7. The laminated capacitor of claim 6, wherein the first current path and the second current path associated with each of the second internal electrode layers provide an open stub which generates open stub resonance is formed in an equivalent circuit in the capacitor.

\* \* \* \* \*